United States Patent [19]

Taniguchi et al.

[11] Patent Number: 4,669,847

[45] Date of Patent: Jun. 2, 1987

[54] AUTOMATIC PROCESSOR

[75] Inventors: Shinichi Taniguchi; Akiru Akashi, both of Hino; Yasuo Ujii, Higashiyamato, all of Japan

[73] Assignee: Konishiroku Photo Industry Co., Ltd., Tokyo, Japan

[21] Appl. No.: 693,644

[22] Filed: Jan. 22, 1985

[30] Foreign Application Priority Data

Jan. 26, 1984 [JP] Japan ........ 59-12448

[51] Int. Cl.[4] ........ G03B 3/02

[52] U.S. Cl. ........ 354/298; 354/299; 354/320; 354/324; 137/550

[58] Field of Search ........ 354/298, 320, 321, 322, 354/324, 299; 137/544, 549, 550

[56] References Cited

U.S. PATENT DOCUMENTS

| | | | |
|---|---|---|---|
| 1,062,236 | 5/1913 | Hitchcock | 137/550 |
| 1,438,983 | 12/1922 | Collin | 137/549 |
| 2,880,753 | 4/1959 | Wilkins | 137/549 |
| 2,936,780 | 5/1960 | Pratt | 137/549 |
| 3,115,154 | 12/1963 | Dillon | 137/549 |
| 4,182,567 | 1/1980 | Laar et al. | 354/324 |

FOREIGN PATENT DOCUMENTS

| | | | |
|---|---|---|---|
| 815574 | 3/1981 | U.S.S.R. | 137/550 |

*Primary Examiner*—A. A. Mathews
*Attorney, Agent, or Firm*—Jordan B. Bierman

[57] ABSTRACT

An automatic photographic processor having a filter provided in a circulating flow path of the processing liquid used in a developing tank. A control device calculates the total quantity of light-sensitive material processed by the liquid since the filter was last changed. The control device generates a warning signal when the total quantity reaches a predetermined value. An acoustical or optical warning device responsive to the warning signal indicates that the filter should be changed. A flowrate meter or pressure detection system in the circulating flow path checks the effectiveness of the filter and can also generate a warning signal for the warning device to indicate that the filter should be changed.

18 Claims, 2 Drawing Figures

AUTOMATIC PROCESSOR

BACKGROUND OF THE INVENTION

1. Field of the Invention

This invention relates to an automatic processor for processing light-sensitive materials and more particularly to an automatic processor capable of automatically informing a time of replacing a filter provided to check the contaminations in a processing liquid.

2. Description of the Prior Art

Generally, an automatic processor is equipped with a thermostatic control means for keeping a processing liquid at a given temperature so that the finished image quality of a photographic light-sensitive material (hereinafter called simply a light-sensitive material) such as a photo film and a photoprinting paper may be maintained at a constant level.

The thermostatic control means comprises a heat exchanger provided onto a circulating flow path so arranged as to draw off a processing liquid from a processing liquid tank and to send it back again to the tank.

On the other hand, a piece of filter is used to satisfy one of the requirements for the stable processing of a light-sensitive material. It is needless to say that such a filter adsorbs gelatins or various additives eluted from the light-sensitive material being processed, chips of the light-sensitive material, dusts in the air and the like so that the processing liquid may consequently be kept uncontaminated. And yet, as a quantity processed is on the increase, the filter is clogged with dusts because the adhesion of dust thereto is increased. If this is the case, the filter cannot perform its own functions. In other words, the filter will disturb the circulation of the processing liquid so that a processing temperature cannot suitably be controlled and the finished image quality of the light-sensitive material is lowered resultantly.

It is, therefore, desired to replace filters regularly. Heretofore, however, there has not been found out any means for detecting a clogged filter, and such filters have been replaced periodically as prescribed in the instruction manual attached to an automatic processor. However, a period for producing clogs on a filter is varied according to how many light-sensitive materials processed, the quality of water and the like. It is, therefore, unsuitable that the replacements of filters are made at every prescribed period for operating an automatic processor. There may be some disadvantageous instances where, for example, a user may reluctantly replace a still usable filter, and a finished image quality of light-sensitive material may be lowered due to the delay in replacement that will make clogs serious. In addition to the above, there is another disadvantage that a user may sometimes forget to replace filters because the replacement period is stated only in the instruction manual of his processor.

OBJECTS OF THE INVENTION

It is one of the primary objects of this invention to provide an automatic processor capable of solving the above-mentioned disadvantages remaining unsolved in the conventional processors and also capable of replacing filters at every suitable period.

Another one of the objects of this invention is to provide an automatic processor capable of readily replacing the filters.

These and other objects of this invention will become apparent from the following detailed description of a preferred embodiment taken in connection with the accompanying drawings.

DETAILED DESCRIPTION OF THE PREFERRED EMBODIMENTS

An embodiment of this invention will now be described by way of example and with reference to the accompanying drawings.

Figure 1:
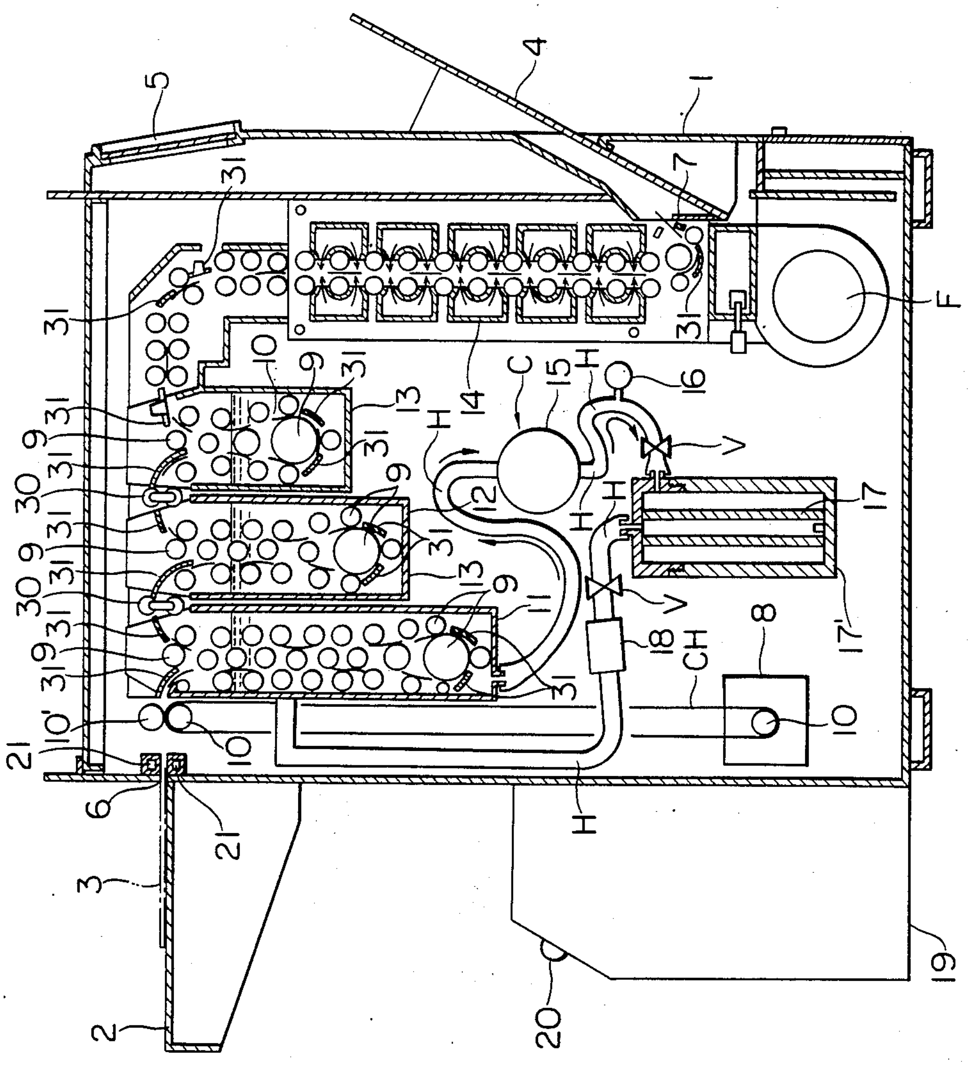
FIG. 1 is a schematic sectional view of an automatic processor embodied according to this invention.

In FIG. 1, reference numeral 1 is an automatic processor housing capable of shielding external light. In front of housing 1 there is provided with a supply table 2 used for supplying each of undeveloped (i.e., unprocessed) light-sensitive materials, and in the rear of housing 1 there is provided with a catch rack 4 for receiving each of processed light-sensitive materials through a series of processing steps.

The above-mentioned automatic processor is so installed as to position the supply table 2 to the dark room side and the catch rack 4 to the daylight room side. There is an operation panel 5 on the top of housing on the side of catch rack 4 and to which a group of necessary operation switches, display devices and the like. The detailed description thereof will be omitted herein because the operation panel 5 is not substantially related to this invention.

Between light-sensitive material inlet 6 positioned in confrontation with the supply table 2 and light-sensitive material outlet 7 attached to the catch rack 4, that is, inside the housing 1, there are provided into each processing tank with many feed rollers 9 (which are intermittently omitted to show in FIG. 1) driven at a substantially uniform revolution by driving means (e.g., a motor), so that a zigzag travelling passage (not denoted by numeral) for light-sensitive materials can be formed. 11 is a developing tank, 12 is a fixing tank, 13 is a washing water tank and 14 is a drying unit.

When embodying this invention, the power of motor 8 is transmitted from one of sprockets 10 provided on to a power shaft (not shown) to the other sprocket 10 so that the power can be transmitted to all the rollers through suitable means such as a worm gear and worm wheel. 10' is a guide roller rotatably driven by a roller attached to the described sprocket. 30 is each of a pair of rollers interposed in each of processing liquid tanks 11, 12, 13 so that a light-sensitive material (in sheet in this example) can smoothly be conveyed into the successive tanks. The above-mentioned processing liquid tanks 11, 12, 13 are detachably suspended to the processor frame so that they can be pulled out upward from the processor frame. 31 each are fixed guide members arranged in to a light-sensitive material conveyance passage. In FIG. 1, there are many rollers each of which is to be brought into contact with the opposite roller, however they are illustrated separately from each other so as to be easy to understand. The arrow marks shown inside each segment (indicated by oblique lines) of drying unit 14 indicate the directions of every warm-air flowed from fan F provided to the bottom of the processor. C is a circulating flow path of a processing liquid (i.e., a developer) stored in developing tank 11. H is a hose for forming circulating flow path C. One end of hose H is connected to developing tank 11 at a cylindrical protrusion provided to the bottom of the tank 11 and the other end thereof is connected to the tank 11 at a position of the tank 11 where is lower than the interface of the processing liquid. In the drawing, the other end of hose H seems to be connected through the left side wall of the tank 11, but is actually constructed so as to be connected through the wall thereof rectangular to the page of this drawing. 15 is a liquid feeding pump provided midway to the circulating flow path. 16 is a detecting means so provided as to detect the variations of processing liquid flow in the circulating flow path between the pump 15 and filter 17 (or a filter holding means) which will be described later, and a pressure sensor is used in this particular embodiment so as to detect the variations in liquid pressure. It is a matter of course that the variations of a processing liquid flow can be detected by a means for detecting the flux of a processin liquid in place of the described pressure sensor. In using a pressure sensor, it is desired to arrange it to this side of holding means 17', seeing from the direction of a processing liquid flow.

As described above, "a detecting means for detecting the variations of a processing liquid flow" appeared in the present specification includes such a detecting means for detecting the variations of a liquid pressure or a liquid flux. These detecting means may be publicly known, therefore the description of the detailed constructions thereof and the like are omitted herefrom. 17' is a means for holding a filter (described later), whose one end is connected to one side of the circulating flow paths through the primary valve V and the other end is connected to the other side of circulating flow path C connected to the developing tank 11. Such filter holding means 17' having a space inside (not shown) is divided into the cover and the main body (not indicated by any reference numerals) which are fitted to each other with screws to unite into a body, and the filter holding means united in a body is freely detachable from the fixtures (not shown) of the main frame of the processor. The described cover and main body of the filter holding means may needless to say be united into a body in any other suitable way. And, it is not essential to this invention that filter holding means 17' is so constituted as to be detachable from the main body. It is possible, for example, that a cover and the means body are united in a body by the use of a hinge so as to be detachable from the fixtures of a processor body. It is also possible to constitute a filter holding means so as to make the cover separable from the means body and to make the means body rotatable about the fixture of the processor body.

The point of the above is that a part of such a circulating flow path is so constituted as not to leak any liquid while the liquid is circulated and not to interfere the function of a filter when replacing the filter.

A hollow cylinder-shaped filter is placed inside a cylindrical filter holding means 17' and it has such an outside diameter as determined to make a gap between it and the internal wall of the holding means. The filter positioning is so regulated as to couple the hollow thereof to a protrusion provided to the bottom of the holding means. The top of the cylindrical filter may be pressed by the internal wall of the cover, or no other coupling means may be devised if the above-mentioned coupling method is satisfactory, and if so, it is not desired to form the filter in a hollow cylindrical shape. 18 is a heat exchanger to keep the temperature of a circulating processing liquid constant at a given degree.

Secondary valve means V is provided between the above-mentioned heat exchanger 18 and the holding means. The described primary and secondary valve means V are closed when replacing filter 17 so as to temporarily stop the flow of the processing liquid inside the circulating flow path.

19 is a control unit forming a means for judging a proper point of time for filter replacements. 20 is a means of warning a filter replacement time. This warning means may be either such an acoustic means as a buzzer or such a visual means as a lamp and a display. In this example, a display means was utilized. 21 are sensors for detecting light-sensitive material, which is provided to the vicinity of inlet 6 of light-sensitive material 3, and they **21*a*, 21*b*, 21*c***, are plurally juxtaposed in the rectangular direction to the direction of transporting the light-sensitive material.

Figure 2:
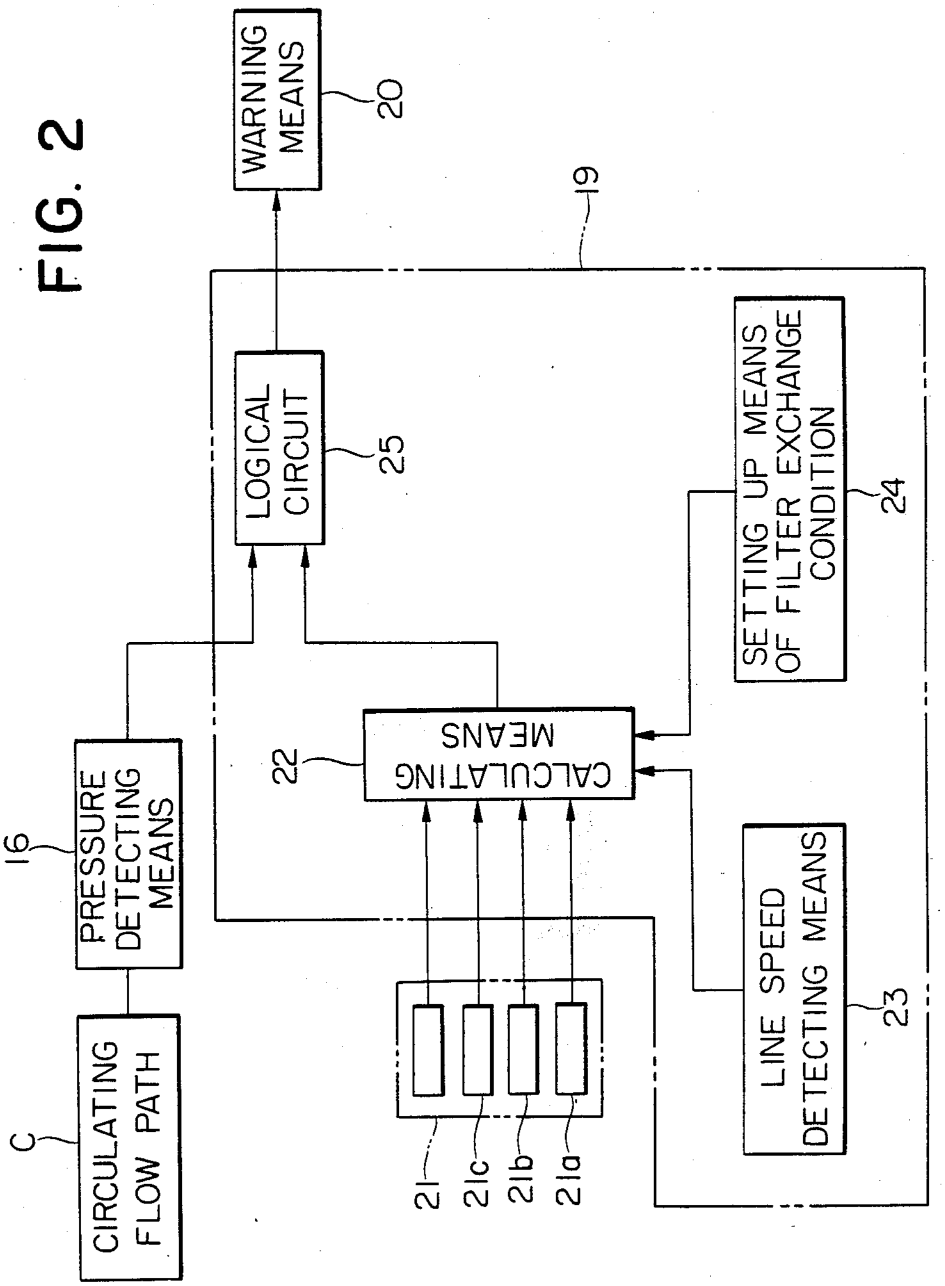
FIG. 2 is a block diagram illustrating an addition of a setting up means of filter exchange condition.

Control section for filter replacement time will now be described with reference to FIG. 2, in which block C indicating a circulating flow path comprises en bloc the circulating flow path shown in FIG. 1 including pump 15, valve means V, filter holding means 17', etc., except detecting means 16. 22 is a calculating means to which the information on the width, leading edge and trailing edge of a light-sensitive material are fed from a plurality of the aforementioned detection sensors 21. Such a microcomputer is suitable for the calculating means and the other means may be allowed to use therefor. 23 is a line speed detecting means which detects a conveyance line speed of a light-sensitive material and then feeds the information thereof to the above-mentioned calculating means 22. In practice, this line speed detecting means 23 is arranged to a position suitable for detecting a line speed of a light-sensitive material by a driving system including the aforementioned driving unit (motor) 8. This practical constitution is of advantage to perform an effective processing of a light-sensitive material without any substantial modification of the constitution, depending on the kinds of the light-sensitive materials and the like. In this case, it is a matter of course that some suitable arrangements are essentially provided to such a relational element as a variable-speed motor and the like. 24 is a setting up means of filter exchange condition. This means is so constituted as to input the information obtained by this means (for example, a quantity processed, a processing time or period indicated in manual mode) to the aforementioned calculating means 22.

In this example, a quantity of light-sensitive materials processed (i.e., an area processed) is set up by the above-mentioned setting up means 24. When an area processed reaches a set up value, the output of calculating means 22 is so constituted as to feed in logical circuit 25. This logical circuit 25 gives a warning (in this example, a warning on an indicator) when inputting thereto either an output signal of the calculating means 22 according to an information of setting means 24 or a detection signal given from detection means 16 when a processing liquid flow is varied to reach a set up value due to the increase of the clogs on a filter. Such a setting up means as mentioned above is not necessarily used from the viewpoint of the spirit of this invention. Nevertheless, in such a constitution as mentioned above is able to employ the following variation. It is usual that setting up conditions indicated in a manual mode (such as a quantity processed, a time or period for processing, etc.) are set up so as to provide an enough time to replace a filter before the filter is seriously clogged. It is, therefore, possible to give a warning stepwise to an operator so that an advance warning for replacing the filter may be given to the indicator at the moment when a quantity processed reaches a given value, and a final warning may be given at the moment when a detection signal is given from detection means 16.

It is of course that a similar warning may be performed stepwise without using any setting up means 24. In this specification, a replacement time for "warning a filter replacement time" stated therein includes a time for necessitating a replacement very shortly or a time of being given an advance warning for a replacement, as mentioned above.

Now, the operation thereof will be described.

When a light-sensitive material 3 is inserted into inlet 6, detection sensors 21 feed the information of the width, leading edge and trailing edge of the light-sensitive material to calculating means 22. Information given from line speed detection means 23 and setting means 24 are fed into calculating means 22. The light-sensitive material is introduced into developer tank 11, fixer tank 12 and washing tank 13, in order. Thus processed light-sensitive material is then introduced into a drying chamber to be treated by hot air and is ejected onto catch rack 4. Such a series of processing is repeated. On the other hand, a processing liquid in the developing tank is continuously introduced into circulating flow path C by the operation of liquid supply pump and is returned again to the tank 11 upon being thermally controlled by heat exchanger 18. This cycle is repeated. During the circulation of the processing liquid, the variations of the flow thereof are always detected by detecting means 16, and waste components mixed in the processing liquid will adhere to filter 17. In a filter section, the processing liquid is introduced into between filter holding means 17' and the filter 17 and is then drained from the hollow of the filter 17. When beginning to clog the filter 17 due to the increase in the amount of light-sensitive materials processed, the flows of the processing liquid will vary. When the clogs are getting serious, the pressure of the liquid is raised in circulating flow path C and particularly in the flow path from the pump to the filter; and when the liquid pressure reaches a certain value (i.e., in a certain state), a detection signal is given from detecting means 16 to logical circuit 25 and warning means 20 will operate to warn that the filter should be replaced. It is needless to say that a similar warning will also be given when calculating means 22 calculates the areas of light-sensitive materials processed and the value of such calculated areas will reach a prescribed value of setting up means 24.

After confirming the above-mentioned state, an operator will close valve means V and remove filter holding means 17' to disconnect from circulating flow path C and replace by a new filter, and will then fit them on in the backward manner. The preparation for the next steps can be made by opening valve means V.

As mentioned above, an automatic processor relating to this invention can display such an effect as first stated that an operator can recognize the proper time of replacing a filter without paying any attention, because the processor can automatically detect the variations of a processing liquid flow in a circulating flow path and the detection thereof is related to the stains or clogs of a filter. There also displays such an effect that light-sensitive materials can be processed in a stable state because a filter is effectively used.

In this example, a circulating flow path is provided to the outside of a developer tank. It is, however, possible to provide it to a developer tank in a body or to provide a part of the circulating flow path to the inside of the developer tank. Also, filters shall not necessarily be in the hollow cylindrical form.

What is claimed is:

1. An automatic processor for processing a photographic light-sensitive material, comprising:

a developer tank, a circulating flow path for circulating processing liquid in said developer tank, a filter provided in said circulating flow path, control means for calculating total quantity of said light-sensitive material processed by said liquid after changing said filter, said control means generating a warning signal when said total quantity reaches a predetermined value, and warning means responsive to said signal.

2. The processor of claim 1 wherein said control means comprises means for sensing a leading edge and a trailing edge of said material.

3. The processor of claim 2 wherein said control means further comprises means for sensing a width of said material.

4. The processor of claim 3 wherein said control means further comprises means for detecting a linear speed of said material while said material is processed by said liquid.

5. The processor of claim 1 further comprising means for adjusting said predetermined value.

6. The processor of claim 1 wherein said filter is held by a holding means which is attachable to and detachable from said path.

7. The automatic processor as claimed in claim 6, wherein said circulating flow path is connected to the bottom of said developer tank so that the processing liquid can be introduced.

8. The processor of claim 6, further comprising a pair of valve means mounted on said path and on both sides of said holding means.

9. The automatic processor as claimed in claim 8, wherein said filter is in the form of a hollow cylinder and the processing liquid is introduced into between said filter and said holding means and is then made flow through the hollow of said filter.

10. The automatic processor as claimed in claim 8, wherein said circulating flow path is provided to the outside of the developer tank.

11. The automatic processor as claimed in claim 8, wherein said warning means comprises a displaying means.

12. The processor of claim 8 further comprising temperature regulating means and heat exchange means, whereby the temperature of said lqiuid is kept constant.

13. The processor of claim 1 further comprising detecting means for detecting a pressure of said lqiuid in said path.

14. The processor of claim 13 wherein said control means generates a second warning signal when said pressure reaches a predetermined level, and said warning means is activated in response to said second signal.

15. The processor of claim 1 further comprising detecting means for detecting a flow rate of said liquid in said path.

16. The processor of claim 15 wherein said control means generates a second warning signal when said flow rate reaches a predetermined level, and said warning means is activated in response to said second signal.

17. The automatic processor as claimed in claim 1, wherein said circulating flow path is connected to the bottom of said developer tank so that the processing liquid can be introduced.

18. The automatic processor as claimed in claim 1, wherein said circulating flow path is provided to the outside of said developer tank.

* * * * *